United States Patent [19]

Shiota

[11] Patent Number: 4,719,494
[45] Date of Patent: Jan. 12, 1988

[54] METHOD OF DETECTING NEGATIVE FILM FRAME WHICH NEED NOT BE PRINTED

[75] Inventor: Kazuo Shiota, Kanagawa, Japan

[73] Assignee: Fuji Photo Film Co., Ltd., Japan

[21] Appl. No.: 31,192

[22] Filed: Mar. 27, 1987

Related U.S. Application Data

[63] Continuation of Ser. No. 718,122, Mar. 29, 1985, abandoned.

[30] Foreign Application Priority Data

Mar. 30, 1984 [JP] Japan ................. 59-064804

[51] Int. Cl.$^4$ .............................................. G03B 27/32
[52] U.S. Cl. ......................................... 355/77; 355/32; 355/41
[58] Field of Search ............................. 355/77, 32, 41

[56] References Cited

U.S. PATENT DOCUMENTS 4,492,458  1/1985  Bickl et al. ............................ 355/77
4,523,839  6/1985  Payrhammer et al. ................ 355/77
4,542,984  9/1985  Shiota et al. .......................... 355/77

FOREIGN PATENT DOCUMENTS 51-3224  1/1976  Japan.
192941  11/1982  Japan.

Primary Examiner—Monroe H. Hayes
Attorney, Agent, or Firm—Sughrue, Mion, Zinn, Macpeak, and Seas

[57] ABSTRACT

A method of making a judgement as to whether or not a negative film frame needs to be printed on a photographic sheet of paper is employed using for the judgement the photographic density of the image on the frame. According to the method, a negative film frame is divided into a multiplicity of small regions, and photographic density values are measured at the small regions. It is judged that a negative film frame need not be printed when a minimum value of the photographic densities measured in relation to any portion or the whole of the frame, or a value which is higher than the minimum value by a predetermined degree, is larger than another specific value.

18 Claims, 4 Drawing Figures

METHOD OF DETECTING NEGATIVE FILM FRAME WHICH NEED NOT BE PRINTED

This is a continuation of application Ser. No. 718,122 filed Mar. 29, 1985 now abandoned.

BACKGROUND OF THE INVENTION

1. Field of the Invention

The present invention relates to a method of detecting any negative film frame which need not be printed which is employed when color printing is effected by the use of an exposed negative color film.

2. Description of the Prior Art

When the images on an exposed negative color film are printed on photographic paper, there may be negative film frames which are not worthy of being printed. Such negative film frames may be roughly classified as follows: The first type of improperly exposed negative film frame includes "ultra-underexposed" negative film frames which have an extremely low photographic density due to underexposure and "ultra-overexposed" negative film frames which conversely have an extremely high photographic density due to overexposure. The second type of improperly exposed negative film frames includes negative film frames carrying images which are out of focus and negative film frames which were mistakenly not exposed at all. As to these two types of improperly exposed negative film frames, means have already been proposed (for example, Japanese Patent Laid-Open Nos. 3,224/1976 and 192,941/1982) by which these improperly exposed negative film frames are positively detected before printing so that they are prevented from being printed.

The third type of improperly exposed negative film frames includes negative film frames which were exposed intentionally or by an operational mistake at the leading end portion or an intermediate portion of a film. In order to detect the third type of improperly exposed negative film frames, a means has been proposed by which a notch, which is normally formed as a confirmation mark by which a negative film frame is recognized as one to be printed, is not formed in a negative film frame which has been exposed at a film edge portion thereof which is outward of a perforation formed at each of the widthwise edges of a negative film. Such confirmation notches or marks are, however, often applied on all the developed negative film frames in a step previous to printing and, therefore, the above-described means is not always reliable in detecting a negative film frame which need not be printed.

SUMMARY OF THE INVENTION

In view of the above-described fact, it is a primary object of the present invention to provide a method of detecting any negative film frame which need not be printed which makes it possible to reliably detect any negative film frame which it is unnecessary to print, particularly improperly exposed negative film frames of the above-described third type, thereby allowing an increase in printing efficiency.

To this end, according to the present invention, there is provided a method of detecting any negative film frame which need not be printed, the method comprising the steps of: dividing a negative film frame into a multiplicity of small regions; measuring a photographic density value at each of the small regions; and judging that a negative film frame need not be printed when a minimum value of the photographic densities measured in relation to any portion or the whole of the frame, or a value which is higher than the minimum value by a predetermined degree, is larger than another specific value.

According to a preferred aspect of the present invention, the photographic density value is a mean value of respective photographic densities of certain color elements, that is, red, green and blue, and, as the mean photographic density value, a weighted mean value is employed which is obtained by giving weight to the photographic density of the color element in the color developing layer closest to the base (i.e., opposite to the photosensitive layer) of a film, whereby even an improperly exposed negative film frame which has been exposed from the base side of the film can be reliably detected, thus increasing printing efficiency.

According to another preferred aspect of the present invention, the photographic density of a color element in the color developing layer of a negative film frame which is closest to the base of the film is measured at a plurality of positions in the frame, and when a minimum value of the measured photographic densities is sufficiently larger than a predetermined value, it is judged that the negative film frame need not be printed, whereby any portion of a negative film exposed from the base side thereof is detected, thereby eliminating the need to print the portion of the film exposed intentionally or by an operational mistake.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
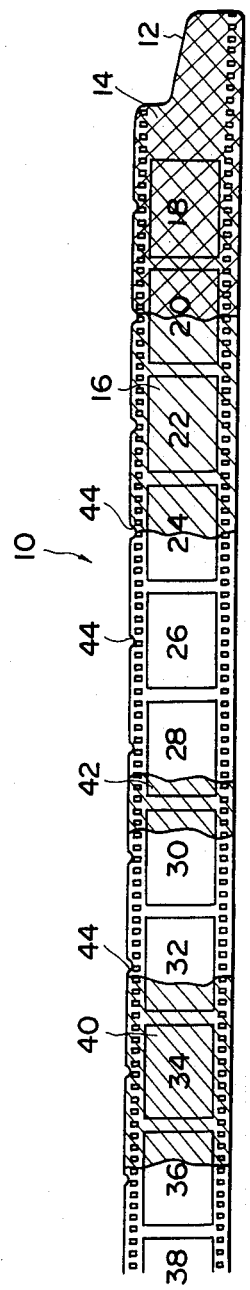
FIG. 1 is a front elevational view of a negative film showing a method of detecting any negative film frame which need not be printed in accordance with the present invention.

Referring first to FIG. 1, there is shown a negative color film 10 including negative film frames which need not be printed and which are to be detected by the method in accordance with the present invention. Before being loaded in a camera, the negative film 10 generally has a tongue portion 12 at the leading end thereof which projects from a film cassette, not shown. With the tongue portion 12 engaged by a film wind mechanism of the camera, a proper number of frames are fed in, and then the camera back is closed, thus making it ready for taking pictures.

In the Figure: the reference numeral 14 denotes a portion of the film 10 which has already been exposed to light because of the fact that the portion 14 projected out from the film cassette before the film 10 was loaded in the camera; the reference numeral 16 denotes a portion of the film 10 which was exposed to light from the base side of the film because of the fact that the film 10 was wound up before the camera back was closed after being loaded in the camera; and the numerals 18 to 38 respectively denote exposed film frames. Further, the reference numeral 40 denotes a portion of the film 10 exposed to light from the base side of the film due to the fact that the camera back was opened by an operational mistake, with the film 10 not rewound, either during the course of using the film 10 or after it had been completely used. Additionally, the numeral 42 denotes a portion of the film 10 which had already been wound and was exposed to light through the film, together with the portion 40. The portions such as those denoted by the reference numerals 14, 16, 40, 42 will hereinafter be referred to as "fogged portions".

These portions 14, 16, 40 and 42 may take various positional relationships with respect to the corresponding frames. In FIG. 1, the frames 18, 20, 22 and 34 have a high photographic density all over each frame area due to fogging overexposure and, therefore, the frames can hardly be seen at all. These negative film frames which need not be printed can be detected by adopting a means in which formation of a notch 44, which is normally formed to enable a frame to be recognized as one to be printed, does not take place in a portion of the film where a frame is not clearly detected, such as the above-described portions. There are, however, cases where such notches 44 are previously automatically formed in correspondence with all the images on the film. For this reason, the above-described means is not a reliable detecting method.

On the other hand, the frames 24, 28, 30, 32 and 36 are partially clear and therefore may be formed with notches 44. As a result, these frames are undesirably printed despite the fact that they do not need to be printed, which fact results in a reduction in printing efficiency. As to the frames 22 and 34 also, when the amount of fogging overexposure is small, that is, when the fogging photographic density is low, it is generally possible for the frames to be visually observed and they may therefore be formed with notches 44, resulting undesirably in the printing of these frames 22 and 34.

Figure 2:
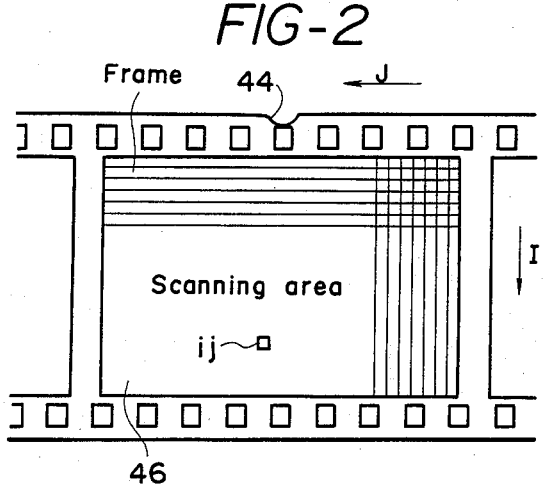
FIG. 2 is an enlarged view of a frame in the film shown in FIG. 1.

Referring next to FIG. 2, which shows a frame 46 in the film in an enlarged view for explanatory purposes, the frame 46 is divided into a plurality (m×n) of regions, both vertically and horizontally. In the frame 46, each of the regions is defined by, for example, the number of divisions i counted in the vertical direction (I) from the upper edge of the frame 46 and the number of divisions j counted in the horizontal direction (J) from the right-hand edge of the frame 46, as viewed in FIG. 2. Then, mean values $DM_{ij}$ of photographic densities respectively measured at the regions are obtained by dividing by three the sum of the respective photographic densities $DR_{ij}$, $DG_{ij}$, $DB_{ij}$ of the color elements, that is, red, green and blue $\{DM_{ij}=(DR_{ij}+DG_{ij}+DB_{ij})/3\}$. If a minimum value $DM_{min}$ of the mean values $DM_{ij}$ is sufficiently large, it is judged that the frame 46 need not be printed. If a minimum value $DM_{min}$ is obtained in relation to a portion of the frame 46 shown in FIG. 2 within an area defined by the horizontal direction (J) which represents, for example, 1 to k or 1 to n and it is judged that the frame 46 need not be printed when the minimum value $DM_{min}$ is sufficiently large, then it becomes possible to detect the fact that it is unnecessary to print all the frames 24, 28, 30, 32 and 36 shown in FIG. 1.

Moreover, according to this embodiment, the method of the invention is also reliably applicable to the portion 14 shown in FIG. 1 and is further applicable to the portions 16 and 40 when the amount of fogging exposure thereat is sufficiently large.

The following is a description of a second embodiment of the present invention. The method in accordance with this embodiment makes it possible to reliably detect the portions 16 and 40 shown in FIG. 1 even when the amount of exposure thereat is not sufficiently large, together with the portion 42. The method in accordance with the second embodiment is based on the fact that the color elements constituting the three primary colors of the film are made different from each other in the degree of color development by the exposure of the film from the base side thereof.

Figure 3:
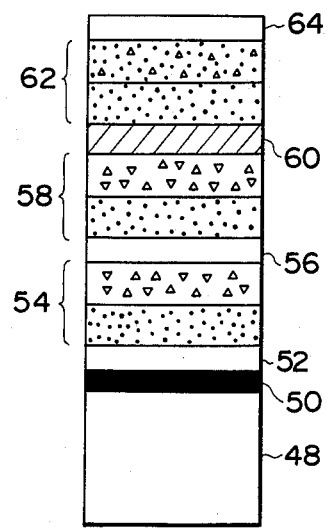
FIG. 3 is an enlarged sectional view of a film.

FIG. 3 is a sectional view showing the layer configuration of an existing negative color film (Fujicolor HR100). In the layer configuration, on a base 48 are successively coated an antihalation layer 50, an intermediate layer 52, a red-sensitive layer 54 containing a red colored cyan dye forming coupler, an intermediate layer 56, a green-sensitive layer 58 containing a yellow colored magenta dye forming coupler, a yellow filter 60, a blue-sensitive layer 62 containing a colorless yellow dye forming coupler and a protection layer 64, thus constituting an emulsion surface.

Accordingly, when light is applied to the film from the emulsion surface side, the red-sensitive layer 54, the green-sensitive layer 58 and the blue-sensitive layer 62 are uniformly sensitized. However, when light is applied to the film from the base 48 side, the blue-sensitive layer 62 is irradiated with light from which the greater part of the blue component has been removed by the yellow filter 60, and the green-sensitive layer 58 is irradiated with light having the green component lessened by the red colored cyan dye forming coupler contained in the red-sensitive layer 54. Accordingly, the degrees of sensitization of the green-sensitive layer 58 and the blue-sensitive layer 62 are extremely low as compared with that of the red-sensitive layer 54.

Figure 4:
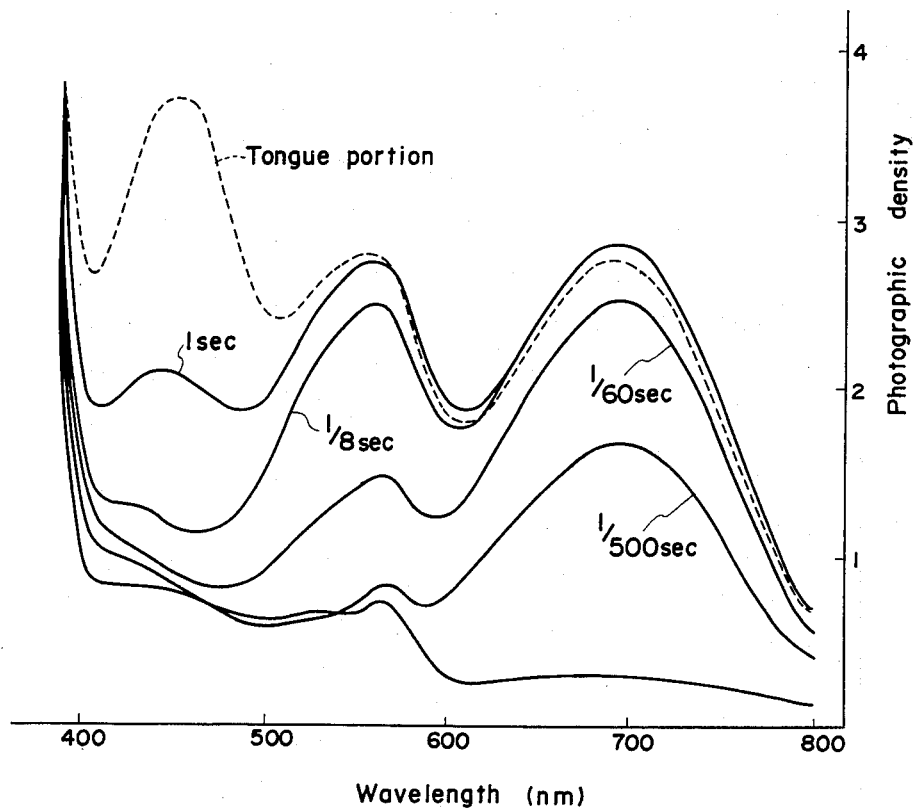
FIG. 4 is a graph representing the rate of the photographic density with respect to the wavelength, which shows the change in the photographic density of each of the color elements in accordance with the exposure time.

FIG. 4 exemplarily shows the color developing condition of each of the color-sensitive layers of a film (Fujicolor HR100) measured when light is applied to the film from the base side in the shade at 500 lux (in the Figure, the peaks on each curve respectively represent the color developing conditions of the red-sensitive layer, the green-sensitive layer and the blue-sensitive layer, from the longer wavelength side). At an exposure time of 1/500 second, only the red-sensitive layer 54 develops color (a photographic density of about 1.4). As the exposure time is gradually increased, the green-sensitive layer 58 also develops color. However, the blue-sensitive layer 62 hardly develops any color at an exposure time shorter than about ⅛ second. In FIG. 4 "masked" shows the situation that the film is not exposed at all.

Accordingly, negative film frames which do not need to be printed in the portions 16 and 40 in FIG. 1 are detected as follows. Employed in place of $DM_{min}$ is a minimum value $DR_{min}$ of the photographic densities $DR_{ij}$ of the red color element or a minimum value $DM'_{min}$ of the weighted mean values $DM'_{ij}$ obtained by giving weight to the photographic densities $DR_{ij}$ of the red color element $(DM'_{ij}=C_R DR_{ij}+C_G DG_{ij}+C_B DB_{ij}$, where $C_R+C_G+C_B=1$, and $C_R>C_G>C_B)$, and when $DR_{min}$ or $DM'_{min}$ is sufficiently large, the frame concerned is judged to be one which does not need to be printed.

The judgement level in relation to such minimum value DMmin or DRmin is to be determined from experience, depending on the type of negative film employed. On the other hand, the area in the frame for obtaining DMmin or DRmin is to be determined on the basis of the commercial criterion of prints according to which criterion the extent of the fogged area of a film frame is determined for making a judgement as to whether or not the film frame needs to be printed.

It is to be noted that the color developed in the portion 42 shown in FIG. 1 is more weak than that in the portion 40. However, since the photographic density of the red color element is particularly high in the three primary colors in a manner similar to FIG. 4, the portion 42 is to be judged as not being needed to be printed when DRmin or DM'min is sufficiently large in a manner similar to the portions 16 and 40 shown in FIG. 1.

There may be a film which has a flaw in its emulsion surface and consequently allows light to pass through the flawed portion without sensitizing any color developing layer. If the portions 14, 16, 40 and 42 in FIG. 1 have such a flaw, DRmin or DM'min takes a small value. In such case, however, it suffices only to employ the m th lowest value DRmmin or DM'mmin in place of DRmin or DM'min. The value of m is preferably 1/5 or less of the total spot number n.

In one experimental example, the above-described embodiments were carried out with a film having fogged negative film frames to be detected which corresponded to about 3% of the whole frames in the film. As a result, it was possible to detect about 60% of the whole fogged negative film frames by the method in which DMmin was obtained and about 90% of the whole fogged negative film frames by the method in which DRmin was obtained.

What is claimed is:

1. A method of detecting any negative film frame of a film which need not be printed, said method comprising the steps of:
   dividing a negative film frame into a multiplicity of small regions;
   measuring a photographic density value at each of said small regions, wherein said photographic density value is a weighted mean value of respective photographic densities of certain color elements, said weighted mean value being obtained by giving more weight to the photographic density of the color element in the color developing layer closest to the base of the film than to the photographic densities of the other color elements;
   determining whether a minimum value of the photographic densities measured in relation to any portion or the whole of the frame is higher than a predetermined value; and
   if the minimum value is higher than the predetermined value, excluding the negative film frame from printing.

2. A method of detecting any negative film frame of a film which need not be printed according to claim 1, wherein said photographic density value is a mean value of respective photographic densities of certain color elements, that is, red, green and blue.

3. A method of detecting any negative film frame of a film which need not be printed according to claim 1, wherein said photographic density value is a photographic density value of only a color element in the color developing layer closest to the base of the film.

4. A method of detecting any negative film frame of a film which need not be printed according to claim 1, wherein said photographic density value is a photographic density value of only a red color element.

5. A method of detecting any negative film frame of a film which need not be printed according to claim 1, wherein a negative film frame is divided into a plurality of regions, both vertically and horizontally, and the determining step comprises the step of determining whether a minimum value of the photographic densities respectively measured at said regions in said frame is larger than a predetermined value, each of said regions being defined by the number of divisions i counted in the vertical direction from one of the widthwise edges of said frame and the number of divisions j counted in the horizontal direction from one of the longitudinal edges of said frame.

6. A method of detecting any negative film frame of a film which need not be printed according to claim 5, wherein said negative film frame is divided into n pieces of regions in the horizontal direction, and the determining step comprises the step of determining whether a minimum value of the photographic densities measured within an area in said frame is larger than a predetermined value, said area ranging from the first region to the k th region, where k is less than n, or ranging from the l th region to the n th region, where l is greater than 1, in the horizontal direction.

7. A method of detecting any negative film frame of a film which need not be printed, said method comprising the steps of:
   dividing a negative film frame into a multiplicity of small regions;
   measuring a photographic density value at each of said small regions, wherein said photographic density value is a weighted mean value of respective photographic densities of certain color elements, said weighted mean value being obtained by giving more weight to the photographic density of the color element in the color developing layer closest to the base of the film than to the photographic densities of the other color elements;
   determining whether a first value which is higher than a minimum value of the photographic densities measured in relation to any portion or the whole of the frame by a predetermined degree is larger than another specific value; and
   if said first value is larger than said specific value, excluding the negative film frame from printing.

8. A method of detecting any negative film frame of a film which need not be printed according to claim 7, wherein when a film has such a flaw as to allow light to pass therethrough in an emulsion surface the m th lowest value of the photographic densities is employed to determine that the film need not be printed.

9. A method of detecting any negative film frame of a film which need not be printed according to claim 8, wherein the m is 1/5 or less of the total small regions.

10. A method of detecting any negative film frame of a film which need not be printed according to claim 7, wherein said photographic density value is a mean value of respective photographic densities of certain color elements, that is, red, green and blue.

11. A method of detecting any negative film frame of a film which need not be printed according to claim 7, wherein said photographic density value is a photographic density value of only a color element in the color developing layer closest to the base of a film.

12. A method of detecting any negative film frame of a film which need not be printed according to claim 7, wherein said photographic density value is a photographic density value of only a red color element.

13. A method of detecting any negative film frame of a film which need not be printed according to claim 7, wherein a negative film frame is divided into a plurality of regions, both vertically and horizontally, and the determining step comprises the step of determining whether a minimum value of the photographic densities respectively measured at said regions in said frame is larger than a predetermined value, each of said regions being defined by the number of divisions i counted in the vertical direction from one of the widthwise edges of said frame and the number of divisions j counted in the horizontal direction from one of the longitudinal edges of said frame.

14. A method of detecting any negative film frame of a film which need not be printed according to claim 13, wherein said negative film frame is divided into n pieces of regions in the horizontal direction, and the determining step comprises the step of determining whether a minimum value of the photographic densities measured within an area in said frame is larger than a predetermined value, said area ranging from the first region to the k th region, where k is less than n, or ranging from the l th region to the n th region in the horizontal direction, where l is greater than 1.

15. A method of detecting any negative film frame of a film which need not be printed, said method comprising the steps of:
dividing a negative film frame into a multiplicity of small regions;
measuring respective photographc density values of certain color elements, that is, red, green and blue at said small regions, and obtaining a plurality of weighted mean values of said photographic density values at said small regions, said weighted mean value being obtained by giving more weight to the photographic density of the red color element than to the photographic densities of the other color elements;
determining whether a minimum value of said mean values in relation to any portion or the whole of said frame, or a value which is higher than said minimum value by a predetermined degree, is larger than another specific value; and
if said minimum value is larger than said specific value, excluding said negative film frame from printing.

16. A method of detecting any negative film frame of a film which need not be printed according to claim 15, wherein said mean values of said photographic density values are values in relation to a specific portion of a negative film frame which is divided into a plurality of regions, both vertically and horizontally.

17. A method of detecting any negative film frame of a film which need not be printed according to claim 15, wherein said mean values of said photographic density values are obtained at a plurality of desired positions on a negative film frame.

18. A method of detecting any negative film frame of a film which need not be printed, said method comprising the steps of:
measuring photographic density values of at least a red color element at a multiplicity of spots in any portion or the whole of a negative film frame;
determining whether a minimum value of either said photographic density values or weighted mean values of said photographic density values and photographic density values of another color element, or a first value which is higher than said minimum value by a predetermined degree, is larger than another specific value, said weighted mean value being obtained by giving more weight to the photographic density of said red color element than to the photographic densities of the other color elements; and
if said minimum value or said first value is larger than said specific value, excluding said negative film frame from printing.

* * * * *